United States Patent [19]
Goetz et al.

[11] Patent Number: 6,160,395
[45] Date of Patent: Dec. 12, 2000

[54] NON-CONTACT POSITION SENSOR

[75] Inventors: Jay R. Goetz, Deephaven; Edgar R. Mallison, Wayzata, both of Minn.

[73] Assignee: Honeywell, Inc., Morristown, N.J.

[21] Appl. No.: 09/188,397

[22] Filed: Nov. 6, 1998

[51] Int. Cl.[7] .................. G01B 7/14; G01B 7/30
[52] U.S. Cl. .................. 324/207.21; 324/207.24; 324/207.25
[58] Field of Search .................. 324/207.14, 207.2, 324/207.21, 207.23, 207.24, 207.25, 252, 173–176; 338/32 R, 32 H

[56] References Cited

U.S. PATENT DOCUMENTS

| | | | |
|---|---|---|---|
| 4,395,695 | 7/1983 | Nakamura | 338/32 R |
| 4,810,965 | 3/1989 | Fujiwara et al. | 324/207.12 |
| 5,351,003 | 9/1994 | Bauer et al. | 324/207.22 |
| 5,600,238 | 2/1997 | Holloway et al. | 324/207.21 |

FOREIGN PATENT DOCUMENTS

| | | | |
|---|---|---|---|
| 497524 | 12/1975 | U.S.S.R. | 324/207.2 |
| 2272060 | 5/1994 | United Kingdom | 324/207.2 |

*Primary Examiner*—Jay Patidar
*Attorney, Agent, or Firm*—Kris T. Fredrick

[57] ABSTRACT

A core of semi-permeable material forms a magnetic circuit having air gaps. A movable magnet provides flux in a first portion and a second portion of the magnetic circuit with the location of the magnet determining the portion. Magnetoresistive sensors in the air gaps provide signals related to the position of the magnet.

18 Claims, 4 Drawing Sheets

NON-CONTACT POSITION SENSOR

CROSS REFERENCE TO RELATED APPLICATIONS (IF ANY)

Not applicable.

U.S. GOVERNMENT RIGHTS (IF ANY)

Not applicable.

BACKGROUND OF THE INVENTION

1. Field of the Invention

The present invention relates generally to position sensors and more particularly to a non-contact position sensor.

2. Description of the Prior Art

There is an increasing need for small, reliable, low cost electro mechanical integrated devices that can be used in system type applications, for example systems for measuring throttle angle in a vehicle, or shaft angle of a tool, displacement of a linear actuator or solenoid, monitoring a condition such as the physical amount of wear on a component so that replacement can be made in a planned orderly way rather than after a failure due to excessive wear. These applications are only a few examples of a need that could possibly be met by such an integrated position sensing device.

Various non-contact position sensor arrangements or magnetic potentiometers using Hall effect devices have been proposed in the past. In one such arrangement a Hall effect device is fixed at a location and permanent magnets are mounted so as to be spaced from the Hall element and to vary the magnetic flux density at the Hall element as the magnets are rotated. Various geometries for the shape of the magnets, the spacing of the magnets and the inclination of the magnets have been proposed. These approaches tend to require relatively large and strong magnets that have been carefully matched and in addition these approaches require precise construction to achieve the proper relationships when the magnets are rotated. In addition temperature compensation techniques are needed.

In another proposed position sensor uses a closed circuit including magnets are yokes. Magnetic leakage flux emanates from the inside surfaces of the yokes and a magnetic sensor is moved along the inside surfaces of the yokes to detect position. The movement of the magnetic sensor results in a complex arrangement.

Thus a need exists for a simple, reliable low cost non contact magnetic position sensor.

BRIEF SUMMARY OF THE INVENTION

The present invention solves these and other needs by providing a non-contact position sensor including a core of semi-permeable material forming a magnetic circuit having a first air gap and a second air gap. A movable magnet provides magnetic flux in a first portion and a second portion of the magnetic circuit with a position of the magnet relative to the core determining the first portion and the second portion. Magnetoresistive (either Anisotropic or Giant Magnetoresistive sensors can be used) sensors located in the air gaps provide signals related to the position of the magnet.

DETAILED DESCRIPTION OF THE INVENTION

Figure 1:
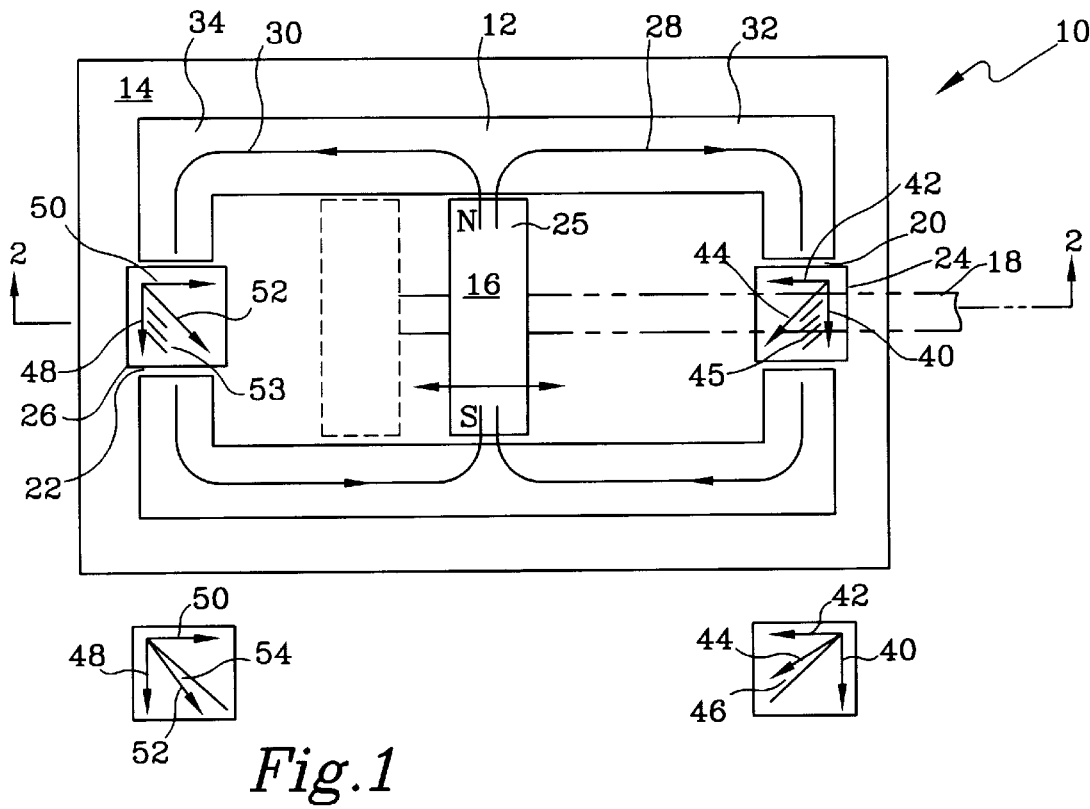
FIG. 1 shows a top plan view of a linear non-contact position sensor according to the teachings of the present invention with portions being shown in phantom.
Figure 2:
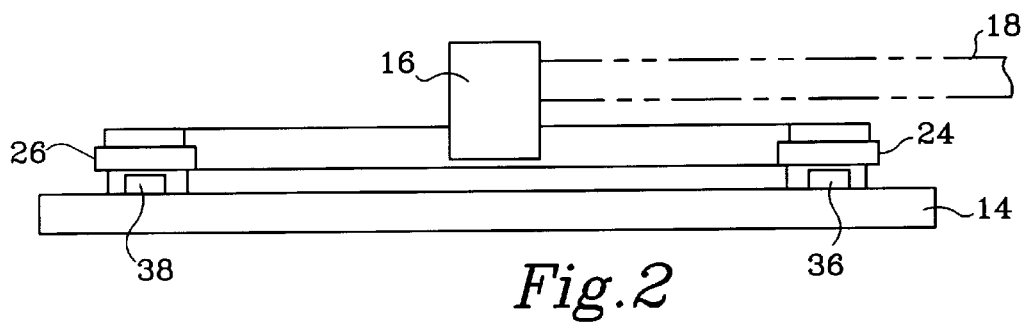
FIG. 2 shows a cross-sectional view of the non-contact position sensor of FIG. 1 according to section line 2—2 of FIG. 1.

A non-contact magnetic position sensor according to the teachings of the present invention is shown in the drawings and generally designated 10. Position sensor 10 as illustrated in FIG. 1 includes a semi-permeable core 12 mounted on a substrate or base 14 and a magnet 16 connected to a movable member or shaft 18, having a close, though not a tight, fit to the inside edges of the core 12. Core 12 includes an air gap 20 and an air gap 22. Magnetic field sensors 24 and 26 are located in air gap 20 and air gap 22 respectively. Magnet 18 is a dipole magnet having a north pole and a south pole. Though it is shown here as a permanent magnet, it can also be an electromagnet. Flux from magnet 18 is guided by core 12 and divides along either a first path 32 or a second path 34 within core 12. Flux lines 28 are guided from a north pole of magnet 16 along path 32 or a right hand portion of core 12 passing through air gap 20 and returning to the south pole.

Flux lines 30 are guided from a north pole along path 34 or a left hand portion of core 12 through air gap 22 and returning to a south pole. Magnet 16 is movable by moving shaft 18 along its longitudinal axis. Magnet 16 is shown in FIG. 1 in a middle position relative to core 12 and may be moved either toward air gap 20 or toward air gap 22 with relatively little force. With magnet 16 in the middle position, magnetic flux may be expected to divide substantially equally between path 32 and path 34 and therefore to provide substantially the same flux density at air gap 20 and air gap 22.

Magnetic field sensors 24 and 26 are selected to sense the magnetic field at air gap 20 and 22 respectively. Sensors 24 and 26 are preferably magnetoresistive sensors operated in a saturated mode and positioned to sense a magnetic field in a direction in line with core 12 at air gap 20 and 22 respectively. Typically sensors 24 and 26 are Wheatstone bridge arrangements. In a preferred form a bias field is used in conjunction with sensors 24 and 26 to bring the magnetization into the linear portion of the magnetoresistive characteristic curve. The magnetic field to be sensed is orthogonal to the bias field. The bias field may be created for example by providing a small permanent magnet 36 to bias sensor 24 and a small permanent magnet 38 to bias sensor 26. Alternatively a bias field may be provided by an integrated conductor or current strap, in the sensor, or by an external current coil or strap, on the substrate. In FIG. 1 sensor 24 is assumed to be a herringbone configuration with the direction of the excitation current as shown by hash marks 45 in sensor 24, and the direction of the bias field shown as 42. A barberpole, or other similar version of MR sensor can also be used here. When the magnetic field 40 caused by magnet 16 is equal to bias field 42 then resultant vector 44 will be at an angle of 0 degrees relative to the direction of the excitation current. The 0 degree angle is optimal for the middle or mid-stroke position of magnet 16 since it places the signal in the middle of the most linear range. At sensor 26 the direction of the excitation current in sensor 26 is as shown by hash marks 53, the direction of the bias field is 50. When the magnetic field 50 caused by magnet 16 is equal to bias field 48 then resultant vector 52 will be at an angle of 0 degrees relative to the direction of the excitation current.

As magnet 16 moves, the flux at one of the sensors will increase and the flux at the other sensor will decrease. For example, if magnet 16 is moved toward sensor 26, then the reluctance of the left hand portion of core 12 will decrease and the reluctance of the right hand portion will increase causing magnetic flux 25 to divide with a greater portion traveling along path 30 and across air gap 22 where it is sensed by sensor 26. The dashed line representation in FIG. 1 of sensor 26 shows that when magnet 16 is moved to the position shown in phantom that the magnet induced field 48 seen by sensor 26 increased and the vector sum 52 of magnet induced field 48 and bias field 50 is displaced from the excitation current by and angle 54. The dashed line representation of sensor 24 shows that when magnet 16 is moved to the position shown in phantom that the magnet induced field 40 seen by sensor 26 and the vector sum 44 of 40 and bias field 42 is displaced from the excitation current by an angle 46.

Figures 3, 4:
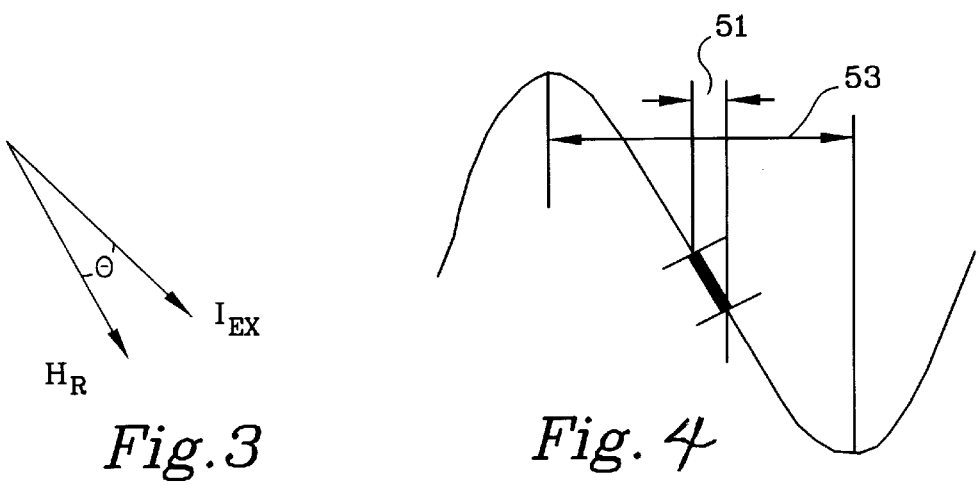
FIG. 3 shows a diagramatic relationship according to the present invention.
FIG. 4 show a plot of an output signal according to the present invention.

According the principles of the present invention a balanced herringbone sensor will have 0 volts output when the resultant of the bias field and the magnet induced field is in the same direction as the sensor excitation current. FIG. 3 illustrates an example of an unbalanced herringbone sensor where resultant $H_R$ is rotated downward from excitation current, $I_{EX}$, by an angle θ. The output of the sensor can be represented by $V_{OUT}=V_{OUTMAX} \sin 2θ$ as shown in FIG. 4. The linearity of the output signal that is needed will depend on the application. A very linear portion 51 of this function can be chosen for example as within about plus or minus 5–6 degrees of the crossover. The monotonic range 53 is plus or minus 45 degrees of the crossover.

EXAMPLE

Assume that:

Bias field ($H_B$)=50 Gauss

Magnet induced field ($H_M$) will vary +/−20% due to movement of magnet.

Therefore:

$$\text{Arctan} \frac{H_M}{H_B} = \frac{40}{50} = 38.6°$$

-continued $$\text{Arctan} \frac{H_M}{H_B} = \frac{60}{50} = 50.2°$$

Thus by causing the magnet induced flux to vary from 40 gauss to 60 gauss the output signal would vary 11.6 degrees over a very linear portion of the output function.

Figure 5:
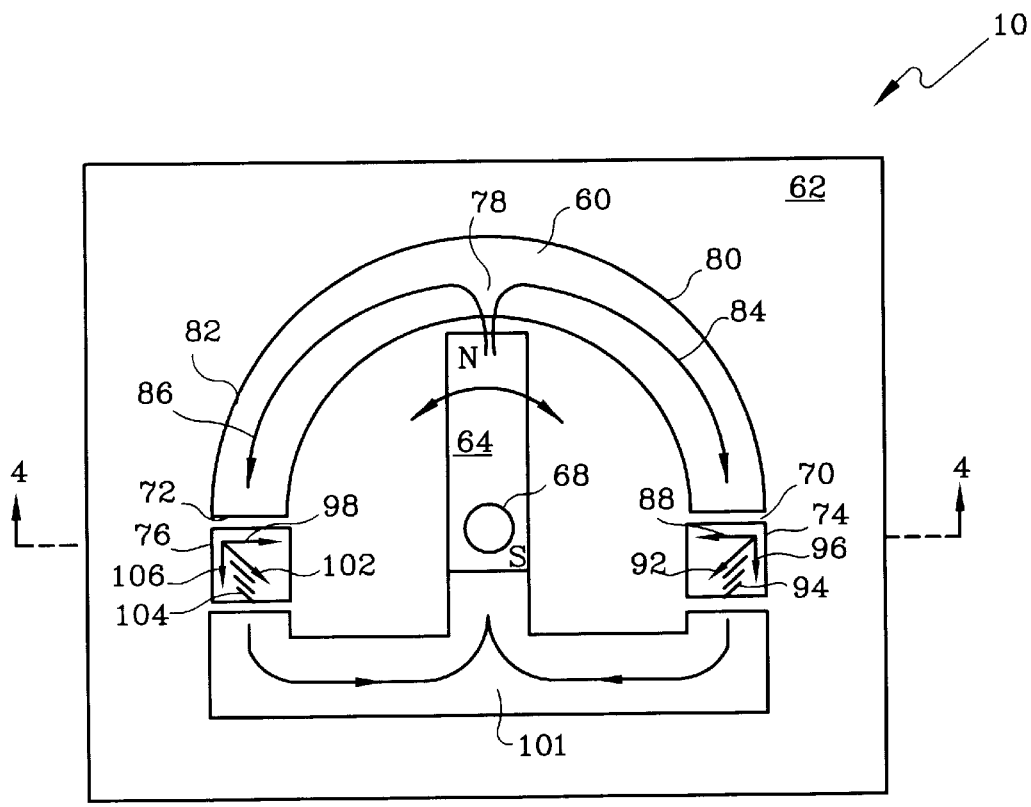
FIG. 5 shows a top plan view of an alternate (rotary) embodiment of a non-contact position sensor.
Figure 6:
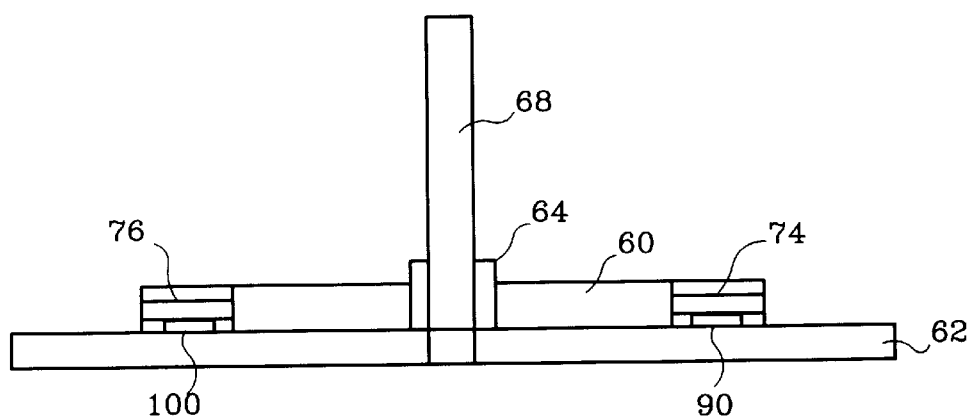
FIG. 6 shows a cross-sectional view of the non-contact position sensor of FIG. 5 according to section line 4—4 of FIG. 5.

An alternate embodiment of non-contact position sensor 10 is shown in FIGS. 5 and 6 and includes a semi-permeable core 60 mounted on a substrate or base 62 and a magnet 64 connected to a movable member or shaft 68 so that magnet 64 may be rotated about an axis of shaft 68. Core 60 includes an air gap 70 and an air gap 72. A magnetic sensor 74 and a magnetic field sensor 76 are located in air gap 70 and air gap 72 respectively. Magnet 64 is a dipole magnet having a north pole and a south pole. Flux 78 from magnet 64 is guided by core 60 and divides along either a first path 80 or a second path 82 within core 60. Flux lines 84 are guided from a north pole along a right hand portion of core 64 passing through air gap 70 and returning to south pole. Flux lines 86 are guided from a north pole along a left hand portion of core 60 passing through air gap 72 and returning to south pole through 101, which is made of high permeability material like iron or permalloy.

Magnet 64 is movable by moving shaft 68 rotationally. Magnet 64 is shown in FIG. 1 in a middle position relative to core 60 and may be moved either toward air gap 70 or toward air gap 72. With magnet 64 in the middle position as shown, magnetic flux 78 may be expected to divide equally between path 80 and path 82.

In FIG. 5 at sensor 74 with bias field 88 provided by permanent magnet 90 equal to the magnetic field 96 created by magnet 64, the resultant vector 92 will be at an angle of 0 degrees relative to the excitation current shown by hash marks 94. At sensor 76 with bias field 98 provided by permanent magnet 100 equal to the magnetic field 106 created by magnet 64, the resultant vector 102 will be at an angle of 0 degrees relative to the excitation current shown by hash marks 104. If magnet 64 were to be rotated slightly counter clockwise about shaft 68 then resultant 102 would move downward and resultant 92 would move upward.

Figure 10:
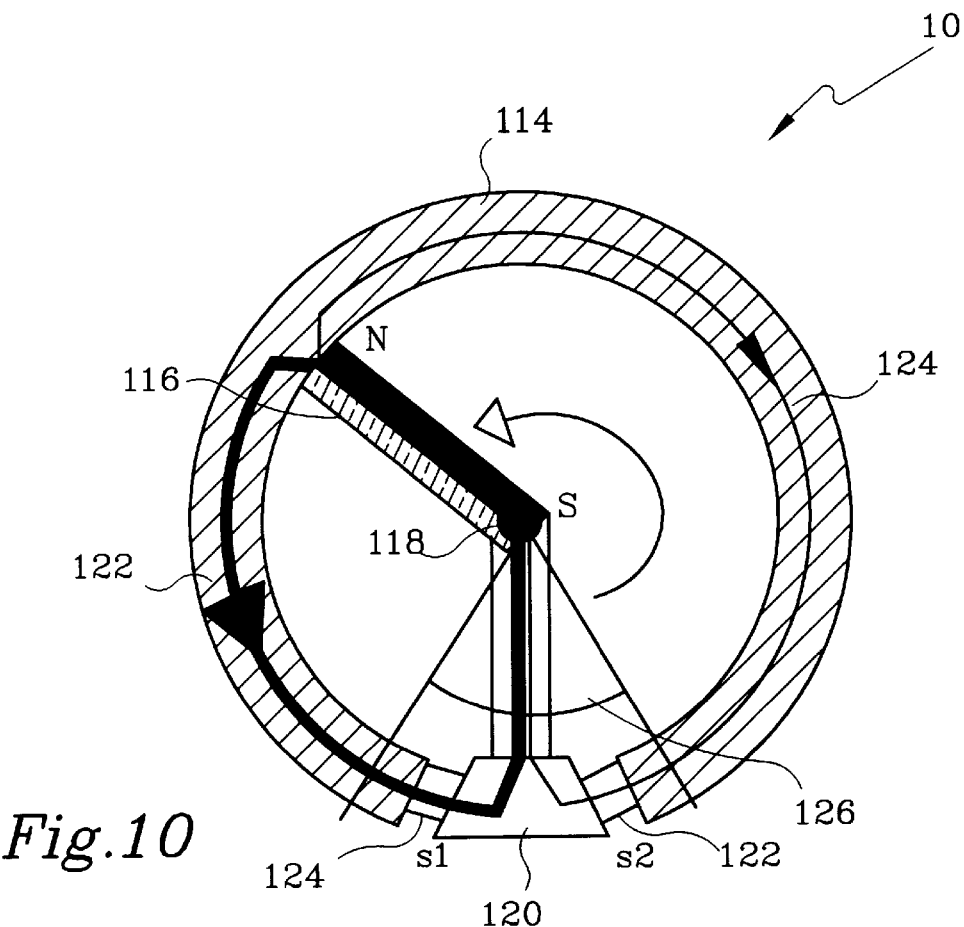
FIG. 10 shows another alternate (extended range rotary) embodiment of a non-contact position sensor.

Another alternate embodiment of the present invention is shown in FIG. 10 which illustrates an extended range planar sensor 10 having a semi-permeable core 114, a magnet 116 constructed to be rotated about an axis 118, a return path 120, made of high permeability material, for flux and sensor 122 and sensor 124 located in air gaps between core 114 and return path 120. Flux path 122 and 124 are shown with operation similar to the embodiment of FIG. 3 except that a greatly extended range is possible. A portion indicated by segment 126 needs to be reserved for sensors 122 and 124 and return path 120. However, a range of about 300 degrees or more is quite achievable.

Figure 11:
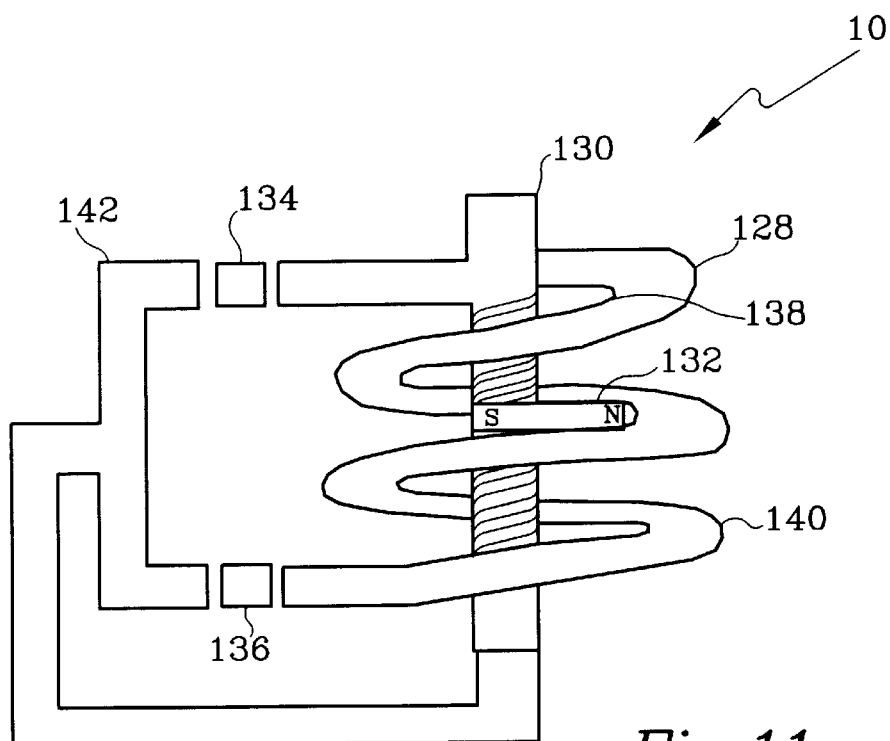
FIG. 11 shows yet another alternate (multi-turn rotary) embodiment of a non-contact position sensor.

Another alternate embodiment is shown in FIG. 11 which illustrates a multi-turn sensor 10 including a spiral shaped semi-permeable core 128, a shaft 130, and a magnet 132 which can vary the length of the two flux paths that will pass through sensor 134, sensor 136 and return path 142. Shaft 130 may be threaded or otherwise be adapted so that magnet 132 may travel up and down shaft 130 while varying the length of the flux paths 138 and 140.

The devices of the present invention use semi-permeable magnetic materials to carry the flux from the magnet to the sensors. An example of one suitable material is NiZn which is a ferrite material with comparatively low relative permeability (compared to Iron or Permalloy). Other materials may also be acceptable as well, such as MnZn, or other combinations of Mn, Mg, Zn, Ni, Iron Oxide. Ferrite Polymer Composites are also usable. It is desirable to have materials with relatively low coercivity.

The permeability of the flux guides should be approximately 20 to 200 times that of air for reasonable signal output swing of the sensors. Another important parameter is the airgap between the poles of the flux guides. This gap must be kept small relative to the length/permeability of the flux guides.

The sensors of the present invention are preferably operated in saturation mode, that is, they are magnetically saturated so that changes in output signals result from changes in the angle of the incident field (Hr). This means that, the value of Hr must be greater than about 50 Oe (Oersted), which can be achieved with small, inexpensive ferrite magnets. These magnets bias the sensor at an angle orthogonal to the magnet induced field. Saturation can be accomplished by permanent magnet, external field winding (electromagnet), or by use of the built-in current straps. If permanent magnets are used, they should have the same field strength. Current straps are preferred in some applications because they provide field angles that are accurate to within the photolithographic accuracy of the thin films on the sensor die.

If the external field winding or built-in strap is excited with an AC field, the sensor can generate an amplitude modulated output proportional to position, thus allowing AC coupling of the sensor and elimination of DC offsets. If winding or straps are used, they can be duty cycle pulsed to reduce power consumption, since the bias is only needed during the measurement period, where an analog to digital (A to D) converter is used. For example, a 20 microsecond pulsed straps gives a stable signal for a 10 microsecond conversion time of the A to D converter, and if the pulse is repeated every 1 millisecond, the duty cycle is 50 to 1, reducing for example a 0.5 amp pulse to an average of 5 mA of current needed continuously.

The present invention has been described in relation to herringbone pattern magnetoresistive sensors but in not limited to this sensor. For example magnetoresistive sensors that use barber pole biasing as well as other types of magnetic field sensors may be used.

Figure 7:
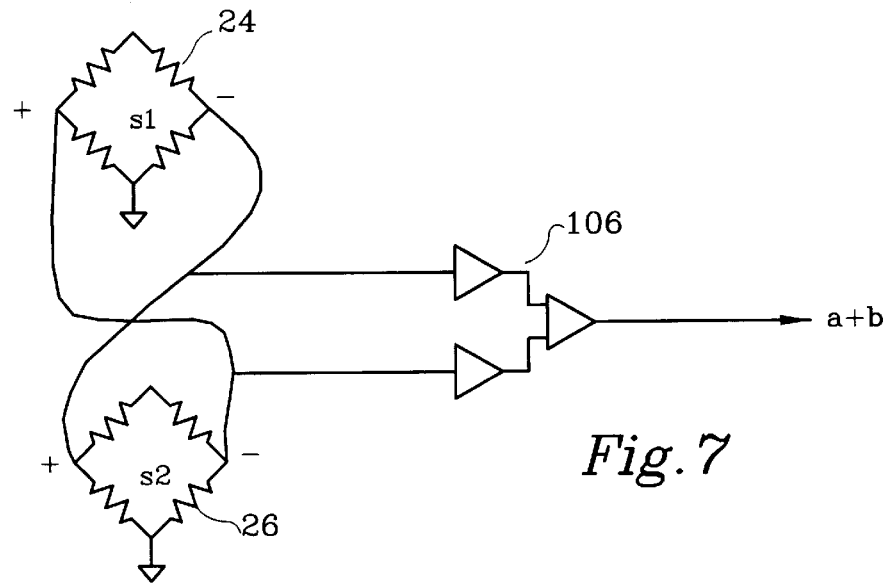
FIG. 7 shows a schematic drawing of one method of processing signals according to the teachings of the present invention.
Figure 9:
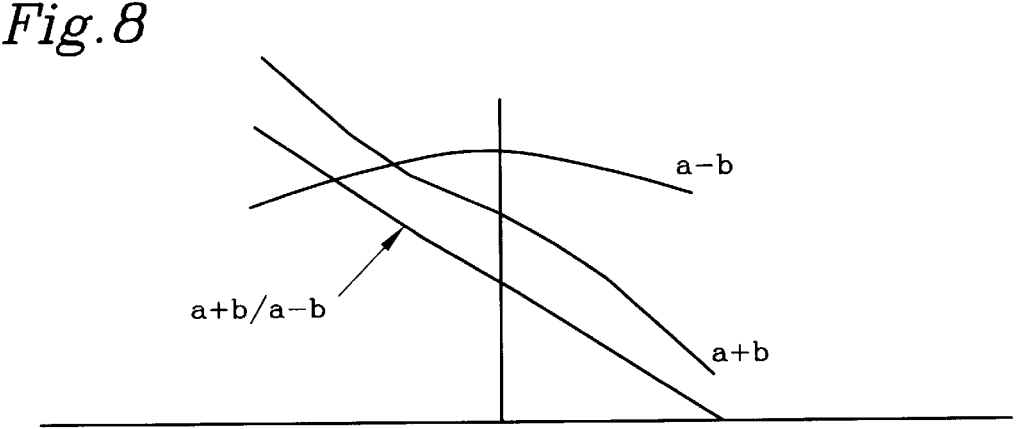
FIG. 9 shows a plot of the characteristics of signal processing according to FIG. 7 and FIG. 8.

There are various options for connection of the magnetic field sensors and the processing of output signals. U.S. patent application Ser. No. 09/059,798 entitled Position Detection Apparatus with Correction for Non Linear Sensor Regions, and having a filing date of Apr. 14, 1998, teaches techniques for ratiometric combination of sinusoidal sensor outputs for immunity to common mode effects like temperature and magnet strength, as well as correction of non linearity and is hereby incorporated by reference. For example sensors 24 and 26 of FIG. 1 may be connected as shown in FIG. 7 where the output of sensor 24 is designated "a" and the output of sensor 26 is designated "b". The connections shown in FIG. 7 and processing circuit 106 results in an output of a+b having a characteristic of magnetic field versus output signals as shown in FIG. 9.

Figure 8:
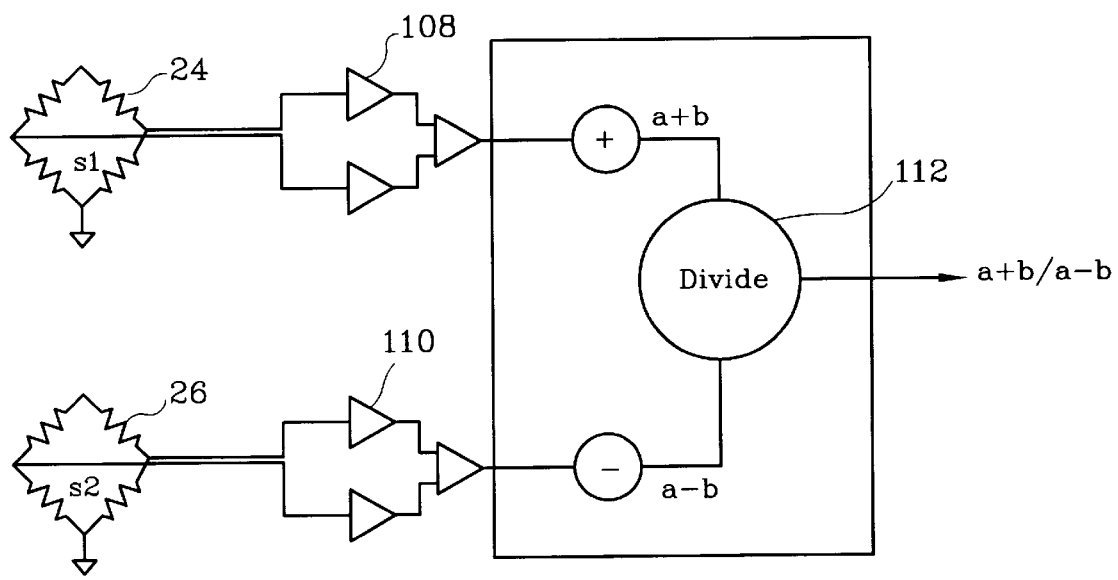
FIG. 8 shows a schematic drawing of alternate methods of processing signals according to the principles of the present invention.

An alternate connection of, for example sensors 24 and 26, is shown in FIG. 8 where the independent output signals of the sensors first go through processing circuits 108 and 110 and provide signals designated as "a", and "b". Circuit 112 then shows that the signals may be processed to provide an output signal of a−b having a characteristic as shown in FIG. 9. Circuit 112 can also provide an output signal of a+b/a−b having a very linear characteristic as shown in FIG. 9.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A non-contact position sensor comprising:
   a movable member;
   means for creating a magnetic field attached to said movable member;
   a core of semipermeable magnetic material guiding flux from said means for creating a magnetic field along a first path and a second path;
   a first magnetic field sensor located along said first path and providing a first signal;
   a second magnetic field sensor located along said second path and providing a second signal;
   said first magnetic field sensor and said second magnetic field sensor operating in magnetic saturation; and
   said first signal and said second signal being related to a position of said movable member with said first signal and said second signal being equal for a position of said movable member wherein said first path and said second path are of a substantially equal length.

2. Non-contact position sensor of claim 1 further comprising means for biasing said first magnetic field sensor and said second magnetic field sensor in a direction substantially perpendicular to said flux.

3. Non-contact position sensor of claim 2 wherein said means for biasing comprises a permanent magnet.

4. Non-contact position sensor of claim 2 wherein said means for biasing comprises a conductive current path located on said magnetic field sensor, or mounted on a substrate.

5. Non-contact position sensor of claim 1 wherein said movable member is a shaft having a longitudinal axis and said shaft is movable along said axis.

6. Non-contact position sensor of claim 1 wherein said movable member is a shaft having a longitudinal axis and said shaft is movable rotationally about said axis.

7. Non-contact position sensor of claim 1 wherein said means for creating a magnetic field comprises a permanent magnet.

8. Non-contact position sensor of claim 7 wherein said magnet has a first pole and a second pole which move in parallel paths.

9. Non-contact position sensor of claim 7 wherein said magnet has a first pole and a second pole and said first pole moves in a path about said second pole.

10. A non-contact position sensor comprising:
    a magnet;
    a core of semi-permeable material defining a first path having a first air gap and a second path having a second air gap with a flux from said magnet dividing into a first portion traveling along said first path and a second portion traveling along said second path;
    a first magnetoresistive sensor at said first air gap providing a first signal;
    a second magnetoresistive sensor at said second air gap providing a second signal;
    means for moving said magnet; and
    said first signal and said second signal being related to a position of said magnet and said first signal and said second signal being substantially equal for a position of said magnet wherein said first path and said second path are of substantially equal length and said first signal and said second signal changing in opposite directions as said magnet is moved.

11. Non-contact position sensor of claim 10 further comprising means for biasing said first magnetic field sensor and said second magnetic field sensor in a direction perpendicular to said flux.

12. Non-contact position sensor of claim 11 wherein said means for biasing comprises a permanent magnet.

13. Non-contact position sensor of claim 10 wherein said means for biasing comprises a conductive current path located on said magnetic field sensor or mounted on a substrate.

14. Non-contact position sensor of claim 10 wherein said magnet has a first pole and a second pole which move in parallel paths.

15. Non-contact position sensor of claim 10 wherein said magnet has a first pole and a second pole and said first pole moves in a path about said second pole.

16. Non-contact position sensor of claim 10 wherein said means for moving said magnet comprises a shaft attached to said magnet.

17. A non-contact position sensor comprising:
- a core of semipermeable material forming a magnetic circuit having a first air gap and a second air gap;
- a magnet providing magnetic flux in a first portion of said magnetic circuit and in a second portion of said magnetic circuit with a position of said magnet relative to said core determining said first portion and said second portion;
- a first magnetoresistive sensor at said first air gap providing a first signal; and
- a second magnetoresistive sensor at said second air gap providing a second signal.

18. Non-contact portion sensor of claim 17 further comprising a shaft attached to said magnet for moving said magnet.

* * * * *